United States Patent Office 3,124,617
Patented Mar. 10, 1964

3,124,617
PREPARATION OF HIGH ENERGY BORON CONTAINING FUELS
Robert G. Brault, Mars, and George F. Huff, Fox Chapel, Pa., assignors to Callery Chemical Company, Pittsburgh, Pa., a corporation of Pennsylvania
No Drawing. Filed June 26, 1958, Ser. No. 745,801
12 Claims. (Cl. 260—606.5)

This invention relates to the preparation of high energy fuels and in particular it concerns a new and improved method for producing high energy fuels by the reaction of ethylene or a lower alkyl diborane and diborane in the presence of certain strong Lewis acids.

The ideal high energy fuel should be a stable, non-volatile liquid with a low molecular weight, a high heat of combustion and a high spontaneous ignition temperature. Compounds containing boron have been found to possess most of these properties, especially the boron hydrides. However, diborane ($B_2H_6$) is a gas at ordinary temperatures and pressures. Pentaborane-9 ($B_5H_9$) is a relatively stable liquid but has a low spontaneous ignition temperature. Decaborane ($B_{10}H_{14}$) is a solid which makes it very difficult to utilize as a fuel unless a solvent is used. Extensive research has been conducted in recent years in an effort to react these boron hydrides with various unsaturated hydrocarbons so that a stable, nonvolatile liquid would result which still had a low molecular weight and an acceptable heat of combustion. This research produced the alkyldiboranes such as tetraethyldiborane ($(C_2H_5)_4B_2H_2$, and other alkyl diboranes of higher boron content, the alkyl pentaboranes such as ethylpentaborane ($C_2H_5B_5H_8$), the alkyl decaboranes such as ethyldecaborane ($C_2H_5B_{10}H_{13}$), and other highly substituted derivatives. Although mixtures of these compounds were improvements in the right direction, they could be even more desirable and valuable by lowering their volatility and increasing their stability. It is therefore, necessary to find methods by which such fuel compositions can be prepared with increased stability and boron content.

It is an object of this invention to provide a new and improved method for producing boron-containing high energy fuels which are more stable and contain a higher percentage of boron than similar fuels made by previously known methods.

It is a further object to provide catalysts, for processes in accordance with the foregoing object, by means of which there is produced a high energy fuel which is a stable liquid having a high percentage of non-volatile components and a high heat of combustion.

It has been discovered, and it is on this discovery that the invention is in large part predicated, that certain strong Lewis acids are capable of functioning as catalysts in reactions of diborane with unsaturated aliphatic hydrocarbons such as ethylene or with a lower alkyl diborane and thereby result in a liquid boro-carbon fuel composition having a better stability and a higher percentage of boron than when the same reaction is carried out in the absence of the catalyst. Using this discovery we have been able to produce liquid boron-base fuel compositions of improved stability, a higher boron content, and a greater percentage of low-volatility constituents than is possible when comparable reactions are carried out in the absence of a catalyst. Moreover, these advantages result without encountering the formation of large quantities of solid by-products.

The basic reactions to which our discoveries apply are known. The manner of conducting the reactions and of the conditions under which they are carried out also are known and form no part of the present invention. It may be noted, however, that the reaction generally is carried out with a mol ratio of diborane to the other reactant of at least 0.2 to 1 and suitably higher, e.g. 1 to 1 or 2 to 1 or the like. Temperatures from about room temperature to 250° C. or higher, and preferably at least 80° C. and higher, are used along with normal or superatmospheric pressure. The reaction system can be homogeneous or heterogeneous, the latter even to the extent of using a solid catalyst, a liquid reactant and a gaseous reactant. Where both reactants are gaseous and the catalyst is either liquid or solid, it is convenient to carry out the reaction at a superatmospheric pressure to facilitate contact. Diluent gases can be used in the process and are useful for such purposes as controlling the character of the atmosphere, e.g. preventing the atmosphere from being or containing an oxidizing gas, and to provide operating pressures where desired. The diluent gas must, of course, be nonoxidizing with respect to the reactants and products.

The catalysts that are used in our invention are boron halides and aluminum halides such, for example, as boron trifluoride, boron trichloride, boron triiodide, boron tribromide, aluminum trifluoride, aluminum trichloride, aluminum triiodide, aluminum tribromide. Boron trifluoride and aluminum trichloride represent the preferred catalysts. While the quantity of catalyst used is essentially determinative of the quantity of reaction rather than its operability, it is preferred to provide the catalyst in an amount 2 to 5 percent by weight of the reactants present. Where a gaseous catalyst and a diluent are used, it is desirable to provide the catalyst at a concentration equivalent to about 5 to 50 volume percent, based on the total diluent and catalyst used.

The invention will be described further by means of the following examples. It is to be understood that the details disclosed are given by illustration and are not to be construed as limiting the invention.

The apparatus used in many of the runs which follow consisted of a tubular glass reactor about 11 inches long having capacity of about 100 ml. It was heated by immersion in an oil bath. The reactor was positioned vertically and the reactants were introduced at the top of the reactor while the products of reaction were allowed to escape at the bottom of the reaction tube into a series of cold traps. The liquid reaction products were collected and analyzed for carbon and boron.

*Example I*

In a series of runs, ethylene and diborane were fed to the reactor over a period of 1 hour using various ratios of boron trifluoride and hydrogen, the latter as a diluent, to determine the effect of the catalyst on the boron content of the resulting product. The reactor was maintained at 200° C. during each run. The liquid products recovered in the cold trapping system were analyzed. The data on the various runs are as follows:

| Run No. | Flow rates in ml./min. | | | | Percent $BF_3$ [1] | Average analysis of volatile and non-volatile liquid reaction products | |
|---|---|---|---|---|---|---|---|
| | $B_2H_6$ | $C_2H_4$ | $H_2$ | $BF_3$ | | B [2] | C [2] |
| 1 | 70 | 23 | 350 | | 0 | 31.8 | 38.7 |
| 2 | 70 | 23 | 346 | 4 | 1 | 26.7 | 39.0 |
| 3 | 70 | 23 | 332 | 18 | 5 | 34.5 | 37.4 |
| 4 | 70 | 23 | 263 | 87 | 25 | 35.9 | 30.6 |
| 5 | 70 | 23 | 175 | 175 | 50 | 47.0 | 18.5 |
| 6 | 70 | 23 | | 350 | 100 | 29.9 | 30.2 |

[1] $BF_3$ is expressed as a percentage of the total volume of $BF_3$ and hydrogen used.
[2] Boron and carbon are expressed as milligram atoms per gram of sample.

It can readily be seen from these data that the use of $BF_3$ as a catalyst within the range of 5% to 50% by volume of the total volume of hydrogen and $BF_3$ used results in an increased boron content of the resulting product. When amounts of $BF_3$ are used outside the above range the boron content of the reaction product is lower than when only hydrogen used. Other experiments showed that increased time of reaction beyond one hour did not materially affect the composition of the reaction product obtained.

Example II

In another series of runs, ethylene and diborane were allowed to react in the tube reactor at a temperature of 250° C. for one hour using various ratios of $BF_3$ and hydrogen in order to determine the effect of increased temperatures and catalyst on the boron content of the reaction product. The results were as follows:

| Run No. | Flow rates in ml./min. | | | | Percent $BF_3$ [1] | Average analysis of volatile and non-volatile liquid reaction products | |
|---|---|---|---|---|---|---|---|
| | $B_2H_6$ | $C_2H_4$ | $H_2$ | $BF_3$ | | B [2] | C [2] |
| 1 | 70 | 23 | 350 | | | 39.5 | 29.1 |
| 2 | 70 | 23 | 346 | 4 | 1 | 38.5 | 32.1 |
| 3 | 70 | 23 | 332 | 18 | 5 | 48.8 | 24.2 |
| 4 | 70 | 23 | 315 | 34 | 10 | 55.3 | 18.4 |
| 5 | 70 | 23 | 263 | 87 | 25 | 51.6 | 14.8 |
| 6 | 70 | 23 | 175 | 175 | 50 | 55.9 | 8.9 |

[1] $BF_3$ as a percentage of the total volume of $BF_3$ and $H_2$ used.
[2] Boron and carbon are expressed as milligram atoms per gram of sample.

It is apparent from an inspection of the above data that the boron content of the liquid reaction product is significantly enhanced when $BF_3$ is used as a catalyst within the range of 5% to 50% by volume of the total volume of hydrogen and $BF_3$ used. The higher temperature resulted in a materially higher average boron content. The reaction product in the reactions described above is a liquid in which the relatively volatile components are low in boron content and contain mainly alkylated diboranes while the relatively non-volatile components are high in boron content and contain a higher percentage of alkylated higher boranes such as the ethyl substituted decaboranes. When $BF_3$ is used as a catalyst, a higher percentage of non-volatile components is formed than when no catalyst is used.

In other experiments the boron content and the non-volatile content of the reaction product of ethyldiborane and diborane was improved by using $BF_3$ as a catalyst. A weighed quantity of the reaction product of ethylene and diborane, known to contain ethyldiboranes, was placed in a 100 ml. autoclave equipped with a stirrer. The calculated amount of $BF_3$ gas was added from a cylinder after the autoclave was sealed. This mixture was cooled to $-80°$ C. and a measured amount of diborane gas was metered in from a cylinder. The entire mixture was then heated at 80° C. and stirred for 1½ hours. After cooling the autoclave, the liquid product was removed and analyzed for boron and carbon. The weight percent of non-volatiles in the product was determined by removing the volatile fraction under a vacuum of 1 mm. Hg. at room temperature. The results of one such experiment with and without $BF_3$ as a catalyst are tabulated below:

| Run No. | Grams Charged | | Wt. percent $BF_3$ | Percent Non-Volatile | Average Analysis of Volatile and Non-volatile Liquid Reaction Products | |
|---|---|---|---|---|---|---|
| | Ethyldiborane | $B_2H_6$ | | | B [1] | C [1] |
| 1 | 20.7 | 32 | 0 | 48.8 | 44.4 | 27.0 |
| 2 | 20.7 | 32 | 5 | 70.0 | 49.0 | 24.4 |

[1] Boron and carbon expressed as milligram atoms per gram of sample.

It is obvious from these experiments that the important effect on the $BF_3$ is the large increase in the proportion of the non-volatile components of the product while retaining, and improving, the boron content. Furthermore, no solid products are formed when $BF_3$ is used.

In other experiments, 200 g. of a mixture of ethyl substituted diboranes were placed in a 250 ml. autoclave and 75 g. of diborane gas were metered in from a cylinder. $BF_3$ gas in an amount equal to 2 wt. percent of the total charges was then added and the autoclave was pressurized with 500 p.s.i.g. of hydrogen gas. After heating this mixture at 80° C. for 1½ hours, the liquid products were analyzed for boron, hydrogen and carbon. The weight percent of non-volatiles in the product was determined by removing the volatile fraction under a vacuum of 1 mm. Hg at room temperature. It was found that the use of $BF_3$ as a catalyst increased the boron content of the liquid reaction product approximately 5% and that the non-volatile portion increased 10% or more. Since the spontaneous ignition temperature is increased with an increase of the non-volatiles, the heat of combustion is increased with an increase of the non-volatiles, and the heat of the combustion is increased with an increase in boron content, it follows that both of these properties are improved by the use of $BF_3$ as a catalyst. Thermal stability tests also showed that the product obtained when $BF_3$ was used as a catalyst was more stable than when no catalyst was used.

In other experiments, as where tetraethyldiborane and diborane were reacted in the presence of $AlCl_3$ in an autoclave, the analogous catalytic action of aluminum chloride was confirmed. The other halides of boron and aluminum can also be used, but $BF_3$ and $AlCl_3$ are preferred primarily on economic grounds.

High energy fuels prepared in accordance with this invention may be used in the same manner as similar fuels are now used. For example, the liquid fuels can be mixed with at least a stoichiometric quantity of an oxidizer, such as air or oxygen, and be fed to the combustion chamber of a jet engine. The application of a spark or heat or other conventional combustion initiator can be used to burn the mixtures. The fuels may also be used in reaction motors such, for example, as that shown and described in the patent to Malina et al. No. 2,573,471, by placing it in the fuel container while using an oxidizer, such as oxygen, in the oxidizer feed system and then feeding them to the combustion chamber in the conventional manner.

This application is a continuation-in-part of our earlier, copending application Serial No. 507,723, filed May 10, 1955, and now abandoned.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. In a method of preparing a liquid high energy fuel in which ethylene and diborane are reacted in the gas phase to produce a liquid boron-containing product and said product is recovered, the improvement comprising carrying out said reaction in the presence of a non-oxidizing diluent gas and an appreciable amount of a catalyst selected from the group consisting of boron halides and aluminum halides.

2. A method in accordance with claim 1 in which said reaction is carried out within the temperature range of about 200 to 250° C.

3. A method in accordance with claim 1 in which said diluent gas is hydrogen.

4. A method according to claim 1 in which said catalyst is boron trifluoride.

5. A method is accordance with claim 4, said diluent gas being hydrogen and said boron trifluoride being present in an amount of about 5 to 50 percent by volume of the total volume of hydrogen and boron trifluoride present.

6. In a method of preparing a liquid high energy fuel in which an ethyl diborane is reacted with diborane to produce a liquid boron-containing product and said product is recovered, the improvement comprising carrying out said reaction in the presence of an appreciable amount of a catalyst selected from the group consisting of boron halides and aluminum halides.

7. A method in accordance with claim 6 in which said reaction is carried out at a temperature in excess of 80° C.

8. A method in accordance with claim 6 in which said catalyst is boron trifluoride.

9. A method in accordance with claim 8 in which said boron trifluoride is used in an amount of about 2 to 5 percent by weight of the reactants.

10. A method in accordance with claim 6 in which said catalyst is aluminum trichloride.

11. A method in accordance with claim 6 in which said diborane is added to said ethyl diborane under pressure and the resulting mixture is reacted.

12. In a method of preparing a liquid high energy fuel in which diborane is reacted with a member selected from the group consisting of ethylene and ethyl diboranes to produce a liquid boron-containing product and said product is recovered, the improvement comprising carrying out said reaction in the presence of an appreciable amount of a catalyst selected from the group consisting of boron halides and aluminum halides.

No references cited.